Figure 1:
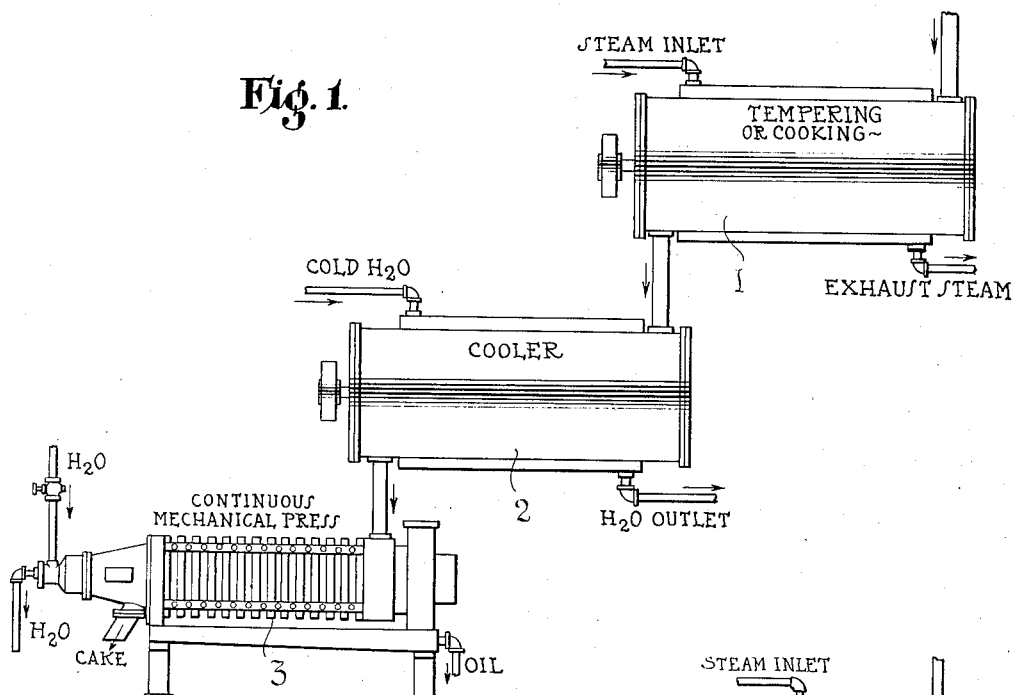

Dec. 29, 1936.  R. T. ANDERSON  2,065,848
PROCESS FOR EXPELLING OIL FROM VARIOUS SUBSTANCES
Filed June 15, 1934

Inventor:
Raymond T. Anderson
By Dodge and Sons
Attorneys

Patented Dec. 29, 1936

2,065,848

UNITED STATES PATENT OFFICE 2,065,848

PROCESS FOR EXPELLING OIL FROM VARIOUS SUBSTANCES

Raymond T. Anderson, Berea, Ohio, assignor to The V. D. Anderson Company, Cleveland, Ohio, a corporation of Ohio Application June 15, 1934, Serial No. 730,820

4 Claims. (Cl. 87—6)

This invention pertains to an improved process of pressing or expressing oil or grease from materials normally containing the same, and this with a view of obtaining a high percentage of oil of high grade and a cake which is relatively low in oil content as compared to the starting material, and which cake is of commercial value.

The process is applicable to the treatment of various growths or materials, such as copra, seeds or beans of various plants, as cotton seed, flax seed, grape seed, castor beans, etc., and the kernels or fleshy elements of various fruits, such as copra, palm fruit, Brazil-nuts, peanuts, pecan nuts, tung-nuts and others.

The process considered in its broadest aspect is, likewise, applicable to the treatment of animal matter, where the same is fibrous to a greater or less extent, including livestock, fowls, either the whole or their inedible parts, and lard cracklings.

In the drawing:—

Figure 2:
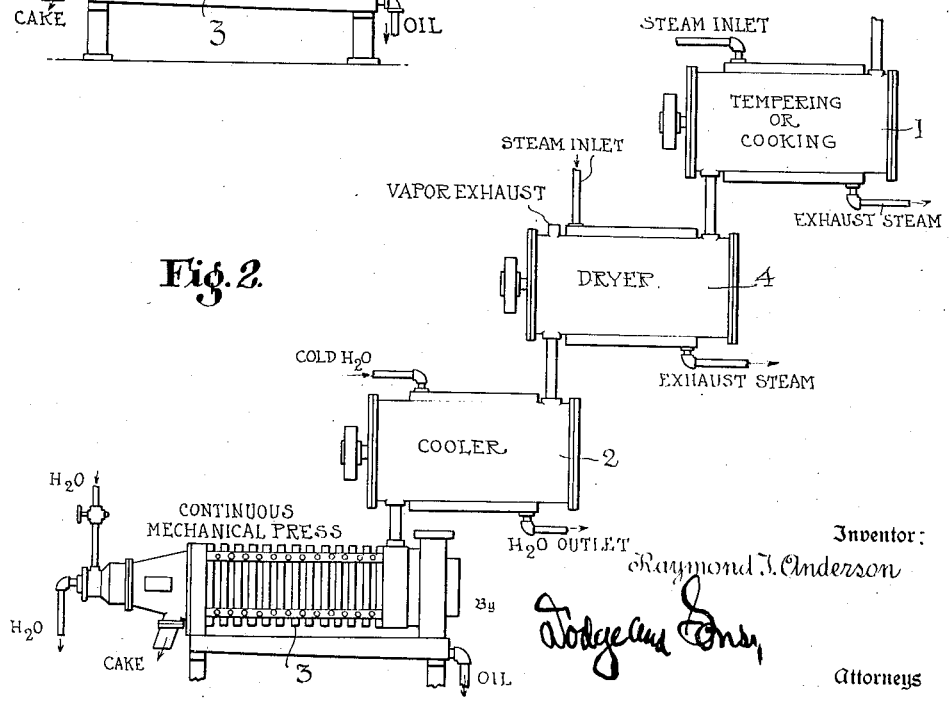

Figure 1 shows an apparatus in general outline, wherein the process, broadly considered, may be carried out; and Fig. 2 is a similar view including the introduction of a dryer in the line between the tempering or cooking tank or apparatus and the cooler.

It is to be understood that the drawing is simply diagrammatic.

Stated generally, the process may be said to comprise means for tempering or cooking the material, then, under proper control, reducing the temperature of such material and passing it to a continuously operating mechanical press. This is the broad general process and is applicable to the apparatus shown in Fig. 1.

The step of definitely cooling the material prior to its passage into the press, materially lowers the formation of gas or steam within the press, which gas, when present, causes the cake to be prematurely discharged, and this before the oil is fully expelled.

In addition to the cooling of the material prior to its introduction into the press, the press itself, or certain elements thereof, may be cooled. Such cooling materially assists the holding down of the formation of gas and steam within the press, and, likewise, prevents scorching or burning of the material, while still permitting the cake to pass out in a slightly brown or toasted condition, which makes it most acceptable as a cattle food.

It will be understood that under ordinary conditions, relatively high temperatures are produced in continuously operating mechanical presses, so adjusted and operated as to produce high internal pressures, with a view of expelling most of the liquid from the material passing therethrough, the resulting cake having a moisture content of 2%, more or less, and being in compacted condition.

Taking copra as an example of the material to be treated, and assuming the apparatus shown in Fig. 1 is to be employed in carrying out the process, the copra is first cleaned to remove all foreign matters, such as sand, stones, metallic particles and the like, and is then finely ground so that 98% thereof will pass through openings of .065″. The copra is then dried according to the acid and moisture content thereof.

From a dryer wherein the material is treated as just mentioned, it passes into a cooker as 1, where it is subjected to the desired degree of heat by the introduction of steam into the jacket surrounding the cooker proper. In this cooker, the temperature of the copra is raised so that as it is discharged from the cooker, its temperature will be from 220° F. to 260° F.

A suitable cooker is shown in Letters Patent to F. V. Anderson, #1,132,421, dated March 16, 1915.

Before the cooked or tempered copra mass leaves the cooker wherein it is cooked in its own moisture, the water content thereof will, if necessary, preferably be raised to 2% or thereabout, in order that the material may be properly acted upon by the expeller or continuously operating mechanical press.

From the cooker, the material passes into a water-jacketed cooler 2, where the temperature is definitely reduced to from 140° F. to 180° F. From there it passes, at the temperatures just mentioned, into a continuously operating mechanical press 3, preferably involving a water-cooled shaft, such a press with a water-cooled shaft being shown in Letters Patent #1,750,916, granted to F. V. and R. T. Anderson under date of March 18, 1930.

It will be understood that any form of commercial cooker or cooler, or mechanical press, which will effect the results desired may be employed.

In the foregoing example, it is to be noted that the copra was stated to have been finely ground. Instead of grinding it finely, it may be reduced to rather coarse particles, say five-eighths to one-quarter inch size pieces, and then introduced into the cooker, along with about 8% moisture.

The cooking of the mass with the moisture forms enough steam to disrupt the oil cells of the copra, but the mass is too wet to be readily treated.

To reduce this moisture, the mass is passed from a cooker as 1 (Fig. 2) into a dryer 4, from which it passes to the cooler 2, and finally into the mechanical press 3. In other words, there has been interposed between the tempering or cooking apparatus 1 and the cooling element 2, means for reducing the moisture content of the mass, so that it passes to the cooler with substantially the correct amount of moisture, as it would were the apparatus of Fig. 1 employed.

The moisture content of the material discharged from the dryer should be lowered to about 4%.

It is evident that instead of employing an independent dryer, the tempering or cooking apparatus may be employed as such after a charge has been properly cooked, but where this is the case it might necessitate interruption of the continuity of the various steps, which continuity is, of course, advantageous.

All of the materials above mentioned, and many other oil bearing substances, including the animal matter, are more or less fibrous in their nature and it is due to this fibrous content that the mechanical press will act upon them continuously to expel the oil and produce the desirable cake.

The materials are, of course, introduced in small pieces into the tempering apparatus.

By pretreating the materials in the manner specified, to wit, tempering or cooking, adjusting the moisture content if need be, and definitely cooling prior to the introduction of the conditioned material into the press, the press will expel the greater part of the oil or fat from the material introduced therein, the same passing outwardly through the openings in the wall of the press, while the cake passes through the cake discharge, which latter, of course, is adjusted to cause the requisite degree of pressure within the press to effect the desired results.

Mention is made above of adjusting the moisture content. As a general rule, the best results are obtained when the moisture content of the material going to the press is between 2% and 4%. All materials will absorb a certain percentage of moisture, and this absorbed moisture can never be fully pressed out. The moisture acts, however, in a sense, as a lubricant and cuts down the friction within the press, while the oil is being expelled. The cake which is formed as the result of the present method is useful as a feed for stock, and with most of the materials above mentioned, it passes from the press in a slightly toasted condition, which makes it all the more palatable.

The protein content of the cake resulting from the above method is much higher than that produced by any other process of which I am aware. Moreover, the nutritive value of the so-called oil-meal (ground cake), say of soya beans, has a "pleasing nut-like taste and aroma", as contradistinguished from the raw "bean-like" taste of such meal when produced under prior methods, to wit, solvent extraction and hydraulic pressing.

If desired, in treating copra salt may be added thereto at any point of the system before it reaches the expeller, the amount being anywhere from .0001% to 1% of the bulk of the material.

Not only does the salt act in a measure as a bleaching agent, but the acid present in the copra is reduced by the presence of the salt. Such salt as remains in the cake, tends to maintain the moisture content thereof, so that it will not lose weight due to evaporation.

The term "oil" as appearing in the claims, is intended to include both oils and fats, unless by reason of the specific form of a claim, fats are excluded.

What is claimed is:

1. That process of treating oil bearing material of vegetable or animal growth to expel the contained oil therefrom, which consists in finely grinding the material and subjecting it to a temperature of the order of 220° F. to 260° F.; thereafter lowering the temperature of the mass to the order of 140° F. to 180° F.; adjusting the water content thereof not to exceed 4%; and finally subjecting the mass to the action of a continuously operating press, whereby the oil is expelled and a relatively dry cake produced.

2. That method of treating oil bearing material of vegetable or animal growth to expel the contained oil therefrom, which consists in subjecting such material while in a finely ground condition to a temperature of the order of 220° F. to 260° F.; adjusting the water content thereof to approximately 2%; lowering the temperature of the same to the order of 140° F. to 180° F.; and subjecting the mass to the action of a continuously operating press, and simultaneously subjecting the mass passing through the press to a further cooling action, whereby the major portion of the oil is expelled and a relatively light colored cake, having a low oil and moisture content, is produced.

3. That method of treating copra to expel oil therefrom and to produce a cake suitable for feeding purposes, which consists in reducing copra to pieces approximating five-eighths to one-quarter inch in size; cooking the same at a temperature of the order of 220° to 260° F. for a period sufficiently long to disrupt the oil cells within said pieces; subjecting the mass thus treated to a drying action to lower its moisture content; cooling the mass to a temperature of 140° to 180° F.; adjusting the water content thereof to the order of 2% to 4%; and finally subjecting the mass to the action of a continuously operating mechanical press, whereby the mass is deprived of substantially all its oil and a cake of commercial value is formed.

4. That method of treating oil-bearing materials of vegetable or animal growth to expel oil therefrom and to produce a cake suitable for feeding purposes, which consists in reducing such material to pieces which will facilitate the cooking thereof; cooking such pieces at a temperature of the order of 220° to 260° F. in the presence of the contained water of the mass in a quantity and for a period sufficient to disrupt the oil cells therein; subjecting the mass thus treated to a drying action and thereby lowering its moisture content; cooling the mass to a temperature of 140° to 180° F.; adjusting the water content thereof to the order of 2% to 4%; and finally subjecting the cooled mass to the action of a continuously operating mechanical press, whereby the mass is deprived of substantially all of its oil and a cake of commercial value is formed.

RAYMOND T. ANDERSON.